United States Patent
Iwata

(10) Patent No.: US 11,416,196 B2
(45) Date of Patent: Aug. 16, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Masahiro Iwata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 208 days.

(21) Appl. No.: 16/559,650

(22) Filed: Sep. 4, 2019

(65) Prior Publication Data

US 2020/0089448 A1    Mar. 19, 2020

(30) Foreign Application Priority Data

Sep. 13, 2018    (JP) .............................. JP2018-171351

(51) Int. Cl.
*G06F 3/12*       (2006.01)
*H04N 1/00*       (2006.01)

(52) U.S. Cl.
CPC .......... *G06F 3/1257* (2013.01); *G06F 3/1204* (2013.01); *G06F 3/1254* (2013.01); *H04N 1/0044* (2013.01); *H04N 1/00233* (2013.01); *H04N 1/00482* (2013.01)

(58) Field of Classification Search
CPC .... G06F 3/1257; G06F 3/1204; G06F 3/1254; H04N 1/00233; H04N 1/0044; H04N 1/00482
See application file for complete search history.

(56) References Cited

U.S. PATENT DOCUMENTS

| | | | | |
|---|---|---|---|---|
| 2004/0252677 A1* | 12/2004 | Kushita | ............... | H04M 1/2748 370/352 |
| 2007/0273923 A1* | 11/2007 | Kimura | ................... | G06F 3/122 358/1.15 |
| 2008/0235594 A1* | 9/2008 | Bhumkar | ............ | G06F 16/9038 715/738 |
| 2012/0143904 A1* | 6/2012 | Ainslie | ............... | G06F 9/44505 707/769 |

(Continued)

FOREIGN PATENT DOCUMENTS

| | | |
|---|---|---|
| JP | 2001186237 | 7/2001 |
| JP | 2003069690 | 3/2003 |

(Continued)

OTHER PUBLICATIONS

"Office Action of Japan Counterpart Application" with English translation thereof, dated May 31, 2022, p. 1-p. 6.

*Primary Examiner* — King Y Poon
*Assistant Examiner* — Michael L Burleson
(74) *Attorney, Agent, or Firm* — JCIPRNET

(57) ABSTRACT

An information processing apparatus includes a memory unit that stores set contents that are obtained by changing standard set contents, a reception unit that receives information regarding the set contents, a search unit that searches, based on the information received by the reception unit, contents stored in the memory unit for the changed set contents that correspond to the information, and a display control unit that performs control in such a manner as to display a search result obtained by the search unit.

12 Claims, 8 Drawing Sheets

(56) References Cited

U.S. PATENT DOCUMENTS

2016/0004492 A1* 1/2016 Lin ....................... G06F 3/1222
  358/1.13
2017/0277393 A1* 9/2017 Iwashita ............. G06F 3/04817
2017/0331964 A1   11/2017 O

FOREIGN PATENT DOCUMENTS

| JP | 2008065402 | 3/2008 |
|----|-----------|--------|
| JP | 2010079416 | 4/2010 |
| JP | 2011031459 | 2/2011 |
| JP | 2012165325 | 8/2012 |
| JP | 2016194786 | 11/2016 |
| JP | 2017204190 | 11/2017 |
| JP | 2018128977 | 8/2018 |

* cited by examiner

FIG. 2

| ROUTINE PROCESSING PARAMETER ID | DESTINATION | CARBON COPY | SUBJECT | TEXT | COLOR | TYPE OF DOCUMENT | ... |
|---|---|---|---|---|---|---|---|
| 0001 | taro@mirai.a | jiro@mirai.a | REPORT | THANK YOU FOR YOUR COOPERATION | MONOCHROME | text | |
| 0002 | saburo@minato.b, shiro@yokoyoko.c | goro@hama.d | WEEKLY REPORT | HERE IS A WEEKLY REPORT | COLOR | photo | |

31a

| ROUTINE PROCESSING PARAMETER ID | ICON ID | ICON IMAGE |
|---|---|---|
| 0001 | 1234 | ... |
| 0002 | 2345 | ... |
| 0003 | 1222 | ... |

31b

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-171351 filed Sep. 13, 2018.

BACKGROUND

(i) Technical Field

The present disclosure relates to an information processing apparatus and a non-transitory computer readable medium.

(ii) Related Art

In recent years, there has been proposed an image forming apparatus that is capable of searching and displaying registered icons and receiving selection of displayed icons (see, for example, Japanese Unexamined Patent Application Publication No. 2011-31459).

The image forming apparatus described in Japanese Unexamined Patent Application Publication No. 2011-31459 includes a display panel that displays an icon imitating what a finished printed material will look like in the case where a function item indicating a function of the image forming apparatus is selected. The image forming apparatus further includes an icon identification information registration unit and an icon identification information display reception unit. The icon identification information registration unit receives an input of icon identification information for identifying an icon (the name of an icon or a common theme among a plurality of icons) performed by a user, associates the received icon identification information and the icon with each other, and registers the received icon identification information and the icon to an icon identification information memory unit. When the icon identification information display reception unit receives an instruction to display the registered icon together with the corresponding icon identification information from a user, the icon identification information display reception unit displays the icon together with the corresponding icon identification information in such a manner that the icon is selectable and receives selection of the displayed icon.

SUMMARY

Aspects of non-limiting embodiments of the present disclosure relate to providing an information processing apparatus and a program capable of, when standard set contents are changed, displaying search results regarding the changed set contents, the results being obtained by a search using information regarding the set contents.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a memory unit that stores set contents that are obtained by changing standard set contents, a reception unit that receives information regarding the set contents, a search unit that searches, based on the information received by the reception unit, contents stored in the memory unit for the changed set contents that correspond to the information, and a display control unit that performs control in such a manner as to display a search result obtained by the search unit.

BRIEF DESCRIPTION OF THE DRAWINGS

An exemplary embodiment of the present disclosure will be described in detail based on the following figures, wherein:

FIG. 2 is a diagram illustrating an example of routine processing parameter information;

DETAILED DESCRIPTION

Figure 1:
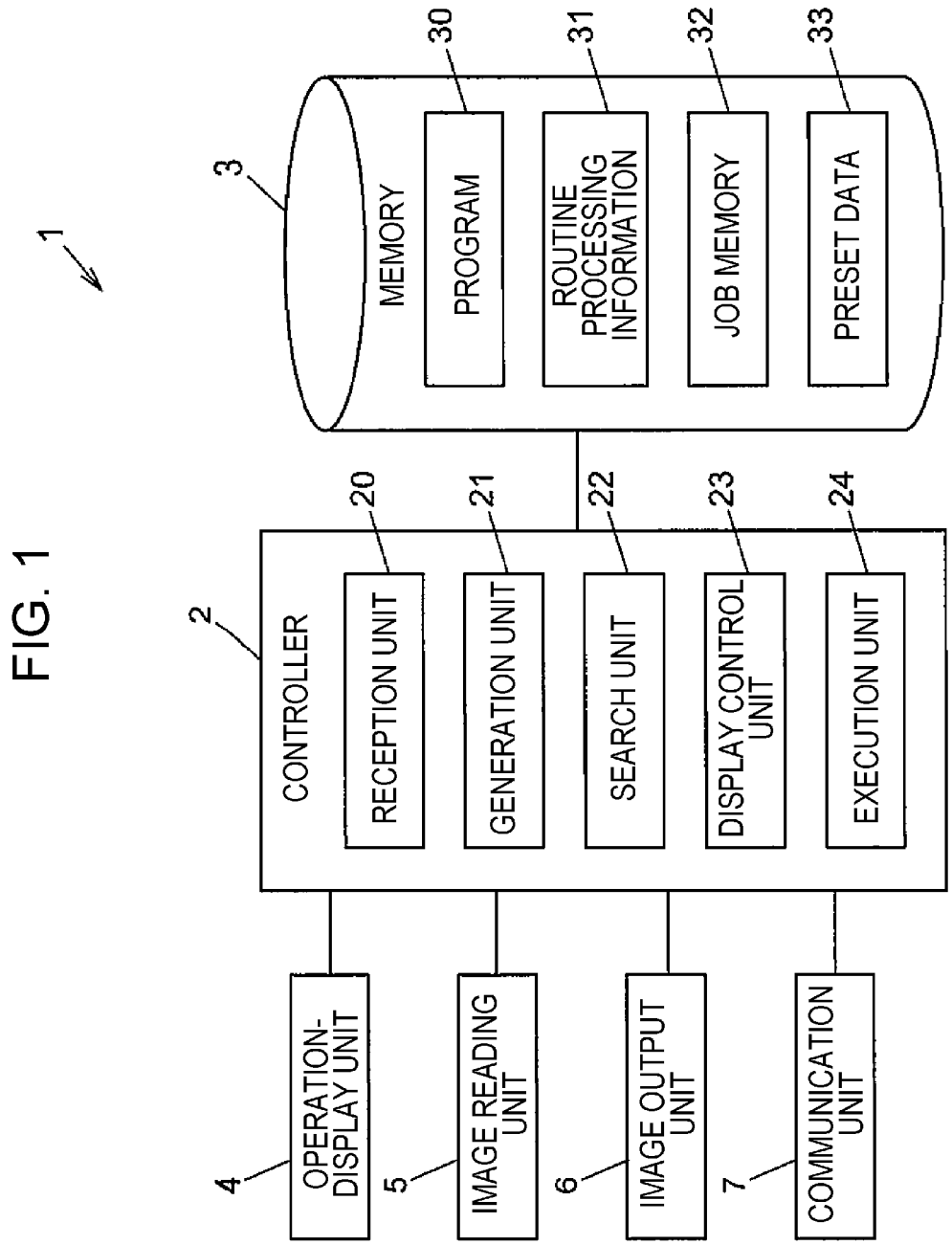
FIG. 1 is a block diagram illustrating a configuration example of an image forming apparatus according to the exemplary embodiment of the present disclosure.

An exemplary embodiment of the present disclosure will be described below with reference to the drawings. Note that, in the drawings, components that have substantially the same functions are denoted by the same reference signs, and repeated descriptions thereof will be omitted. Note that, an image forming apparatus will be described below as an example of an information processing apparatus.

Summary of Exemplary Embodiment

An information processing apparatus according to the exemplary embodiment of the present disclosure includes a memory unit that stores set contents that are obtained by changing standard set contents, a reception unit that receives information regarding the set contents, a search unit that searches, based on the information received by the reception unit, contents stored in the memory unit for the changed set contents that correspond to the information, and a display control unit that performs control in such a manner as to display a search result obtained by the search unit.

The standard set contents refer to set contents that are predetermined to be standard at the time of, for example, shipment from a factory. The set contents refer to set values for setting items (also referred to as parameters). Processing operations that are specified by set contents include not only a single processing operation but also a plurality of processing operations that are coordinated with each other.

Examples of a plurality of processing operations that are coordinated with each other include scanning and email transmission that are coordinated with each other in such a manner that an image obtained by scanning is transmitted by email.

Information regarding set contents includes information included in the set contents and words (e.g., synonymous words and similar words) indicating the same meanings as the information included in the set contents. For example, the word "black" that indicates a monochrome mode corresponds to one of the words having the same meanings as parameter options (color/monochrome) for a printing operation. In addition, the information regarding the set contents includes a destination email address, a set value such as a value of the margin of a copy (e.g., 20 mm), and options (double-sided/single-sided, color/monochrome, and the like), which are examples of set values according to parameters.

Exemplary Embodiment

FIG. 1 is a block diagram illustrating a control system of an image forming apparatus according to the exemplary embodiment of the present disclosure. An image forming apparatus 1 is, for example, a multifunction machine that has a plurality of functions such as a copy function, a scan function, a print function, an email transmission/reception function, and a fax function. The image forming apparatus 1 includes a controller 2, memory 3, an operation-display unit 4, an image reading unit 5, an image output unit 6, and a communicating unit 7. Note that an image forming apparatus such as a printer or a facsimile machine may be employed as the information processing apparatus. The memory 3 is an example of a memory unit.

The controller 2 is formed of a central processing unit (CPU), an interface, and so forth. The CPU operates in accordance with a program 30 so as to function as, for example, a reception unit 20, a generation unit 21, a search unit 22, a display control unit 23, and an execution unit 24. Details of these units 20 to 24 will be described later.

The memory 3 is formed of read only memory (ROM), random access memory (RAM), a hard disk, and the like and stores various information items such as the program 30, routine processing information 31 (see FIG. 2 and FIG. 3), job memory 32, and preset data 33. The routine processing information 31 includes routine processing parameter information 31a, which is illustrated in FIG. 2 and which will be described later, and routine processing icon information 31b, which will be described later.

Applications that perform processing operations (e.g., copying, scanning, and so forth) and set values of parameters for the applications are registered in the job memory 32. The set values of the parameters are registered in the preset data 33 on an application-by-application basis.

The operation-display unit 4 has, for example, a configuration in which a touch panel is disposed so as to be superposed with a display such as a liquid crystal display, and the operation-display unit 4 causes information such as a setting screen to be displayed on a screen and receives an operation performed on the touch panel by a user.

The image reading unit 5 includes, for example, a scanner and an auto document feeder and reads an image from a document that is placed on a document table or a document that is sent from the auto document feeder.

The image output unit 6 employs, for example, an electrophotographic system, an ink-jet system, or the like and forms and outputs an image onto a recording medium, such as a sheet. The image output unit 6 forms and outputs, onto the recording medium, an image that is read by the image reading unit 5 or an image that is included in a print job transmitted from a user terminal device via a network and received by the communicating unit 7.

The communicating unit 7 transmits and receives information to and from an external device such as a user terminal device that is used by a user via a network by, for example, email or facsimile. The network is, for example, a communication network such as a local area network (LAN), the Internet, or a public switched telephone network via which transmission and reception of data is performed by wired communication, wireless communication, or the like.

FIG. 2 is a diagram illustrating an example of the routine processing parameter information 31a. For example, the routine processing parameter information 31a is managed in a list structure. In the case of routine processing in which a scanning operation and an email transmission operation are performed, the routine processing parameter information 31a includes items such as routine processing parameter ID, destination, carbon copy, subject, text, color, and type of document. IDs that identify routine processing parameters are recorded in the routine processing parameter ID. Destination email addresses are recorded in the destination. Carbon copy (Cc) email addresses are recorded in the carbon copy. Subjects of emails are recorded in the subject. Texts of emails are recorded in the text. Options of a printing operation, which are color and monochrome, are recorded in the color. The types of document images (e.g., texts, photos, and so forth) are recorded in the type of document. Values that are recorded in these items including the destination, the carbon copy, the subject, the text, the color, the type of document are set values. Each of the routine processing parameters is obtained by changing and setting the set values of the standard set contents as routine processing that is to be repeatedly performed.

Figures 3, 4:
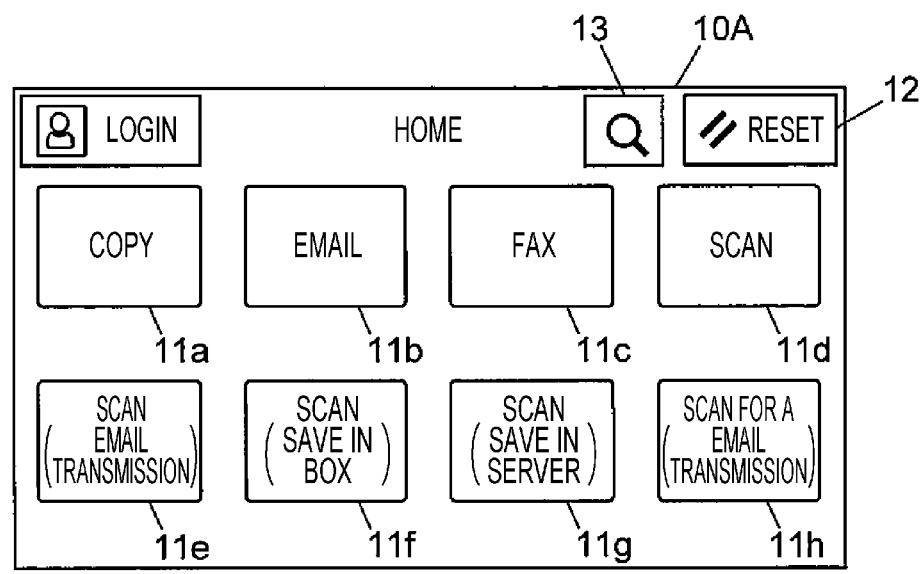
FIG. 3 is a diagram illustrating an example of routine processing icon information.
FIG. 4 is a diagram illustrating an example of a home screen.

FIG. 3 is a diagram illustrating an example of the routine processing icon information 31b. The routine processing icon information 31b includes items such as routine processing parameter ID, icon ID, and icon image. The routine processing parameter ID is the same as the routine processing parameter ID illustrated in FIG. 2. IDs that identify icons (hereinafter also referred to as "routine processing icons") for instructing execution of routine processing operations are recorded in the icon ID. Image data items of the routine processing icons are recorded in the icon image. Icons denote processing functions and are displayed on a screen as pictures, pictograms, symbols, characters, and the like in such a manner as to be used for running applications. Each of the icons is an example of an instruction unit that instructs execution of processing specified by set contents.

FIG. 4 is a diagram illustrating an example of a home screen. Various icons 11, a reset button 12, and a search button 13 are displayed on a home screen 10A. The icons 11, which are displayed, include a "copy" icon 11a for performing a copying operation, an "email" icon 11b for transmitting email, a "fax" icon 11c for performing a facsimile operation, a "scan" icon 11d for performing a scanning operation, a "scan (email transmission)" icon 11e for transmitting an image obtained by performing a scanning operation to a user terminal device, a "scan (save in box)" icon 11f for saving an image obtained by performing a scanning operation into a box in the image forming apparatus 1, a "scan (save in server)" icon 11g for saving an image obtained by performing a scanning operation into a server, and a "scan for A (email transmission)" icon 11h for transmitting an image obtained by performing a scanning operation to a user terminal device that is used by a user A. The search button 13 is a button for making a transition to a search screen. The search button 13 is an example of a selection unit. The user terminal devices, the box, and the server are examples of output destinations. An image obtained by performing a scanning operation is an example of a processing result.

Note that other icons are to be displayed by scrolling the screen. In addition, there may be a case where a "scan for B (email transmission)" icon for transmitting an image obtained by performing a scanning operation to a user terminal device that is used by a user B is generated. The reset button 12 is a button that is used for cancelling selection of the icons 11 and for returning a scrolling position to an initial position. The icons 11a to 11c are used for instructing execution of processing operations that are specified by the standard set contents (default values), and selecting one of the icons 11a to 11c opens a setting screen, so that the set value of each parameter may be set. After the set values for the icons 11a to 11c have been set, when the reset button 12 is operated, or when a certain time has passed, the set values return to their default values. The other icons 11d to 11h correspond to the routine processing icons.

The units 20 to 24 of the controller 2 will now be described.

The reception unit 20 receives information such as an information item regarding a button on a screen that is displayed on the operation-display unit 4, the button having been operated, and an information item regarding a keyword that has been entered.

The generation unit 21 generates an icon for performing set contents obtained by changing the standard set contents and stores the generated icon into the memory 3 as the routine processing parameter information 31a and the routine processing icon information 31b.

Figure 5A:
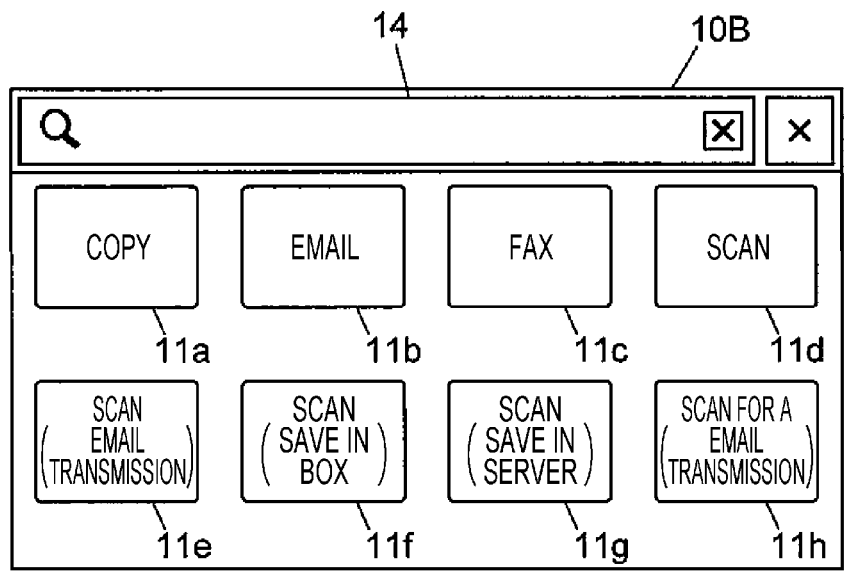
FIG. 5A is a diagram illustrating an example of a search screen.
Figure 5B:
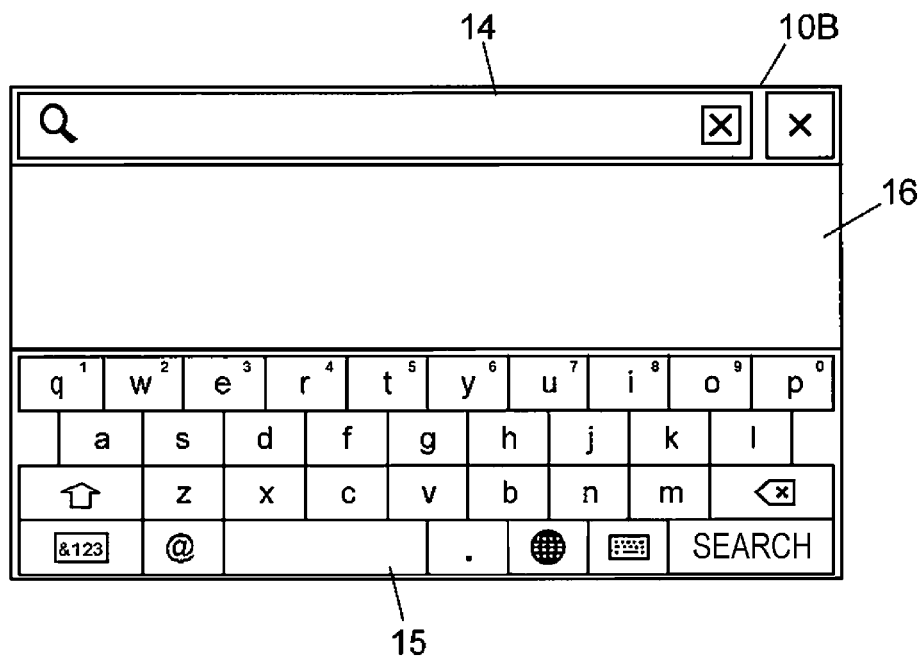
FIG. 5B is a diagram illustrating another example of the search screen.
Figure 5C:
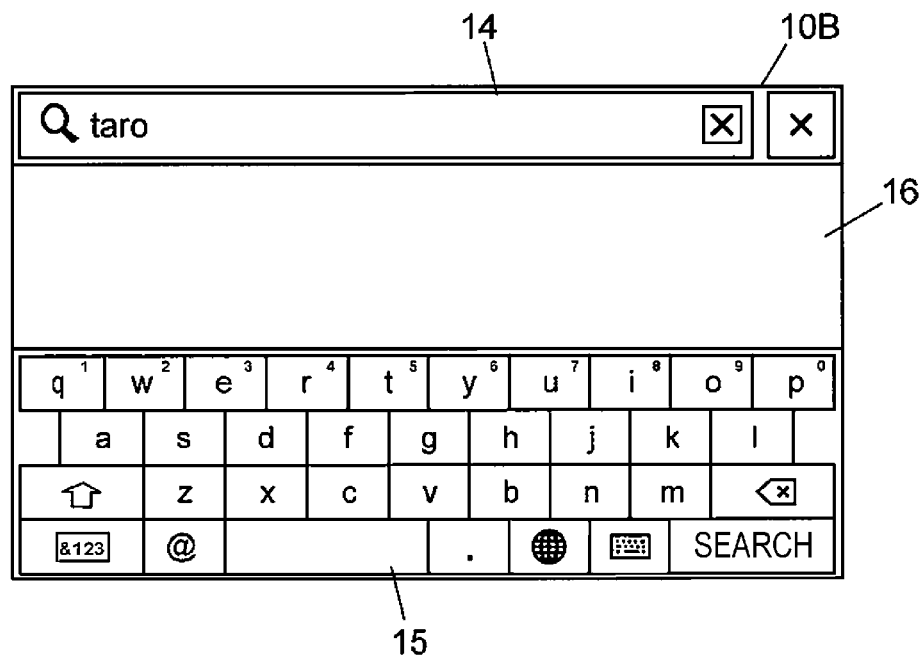
FIG. 5C is a diagram illustrating another example of the search screen.
Figure 5D:
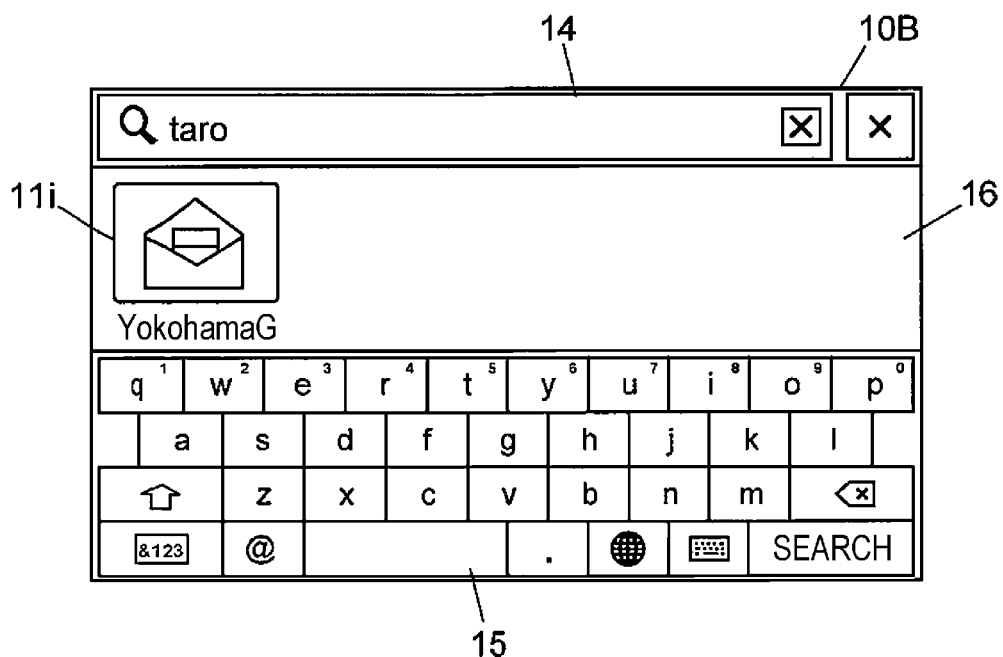
FIG. 5D is a diagram illustrating another example of the search screen.

The search unit 22 searches for a routine processing parameter including a keyword that has been entered in a keyword entry field 14 and causes a routine processing icon 11i corresponding to the routine processing parameter to be displayed on a search result display area 16 of the search screen (see FIG. 5D). A keyword is an example of information regarding set contents. A keyword may be a word (e.g., a synonymous word or a similar word) indicating the same meaning as a set value included in set contents. In addition, a keyword may be entered by using a keyboard or by voice.

When the search button 13 displayed on the home screen 10A is selected, the display control unit 23 performs control in such a manner that a search screen 10B (see FIG. 5A to FIG. 5D) is displayed on the operation-display unit 4. In addition, the display control unit 23 performs control in such a manner that search results obtained by the search unit 22 are displayed on the operation-display unit 4.

The execution unit 24 performs control of the image reading unit 5 and the image output unit 6 in accordance with a parameter and a set value that are associated with an icon selected by a user.

Operation of Image Forming Apparatus

Figure 7:
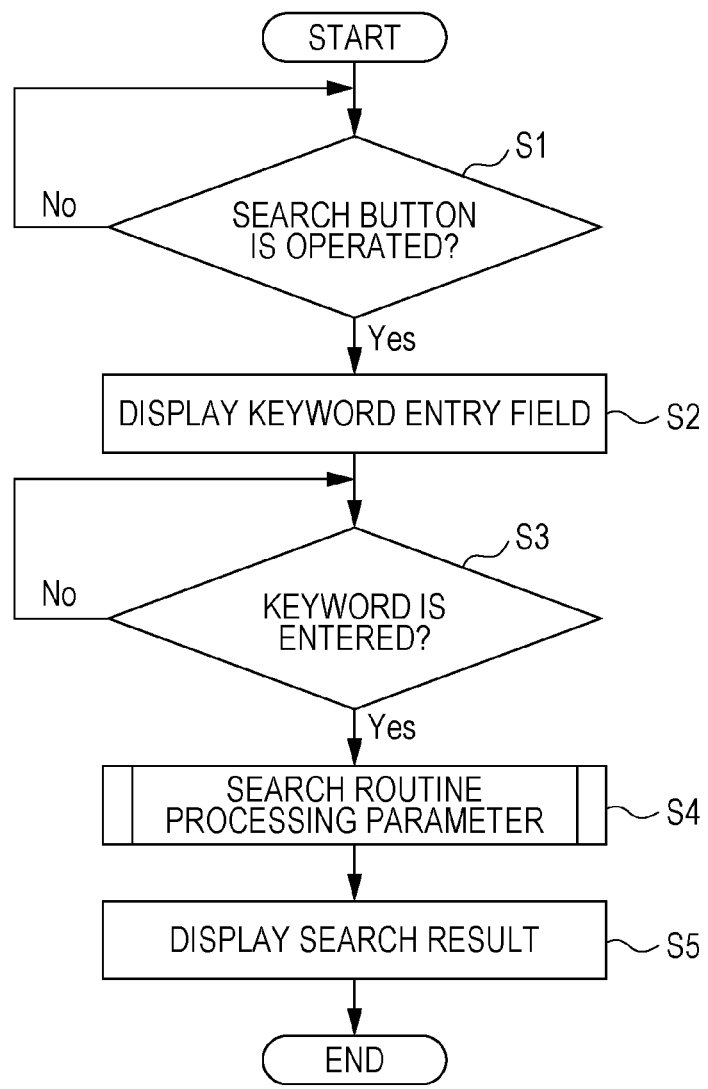
FIG. 7 is a flowchart illustrating an example of the operation of the image forming apparatus.
Figure 8:
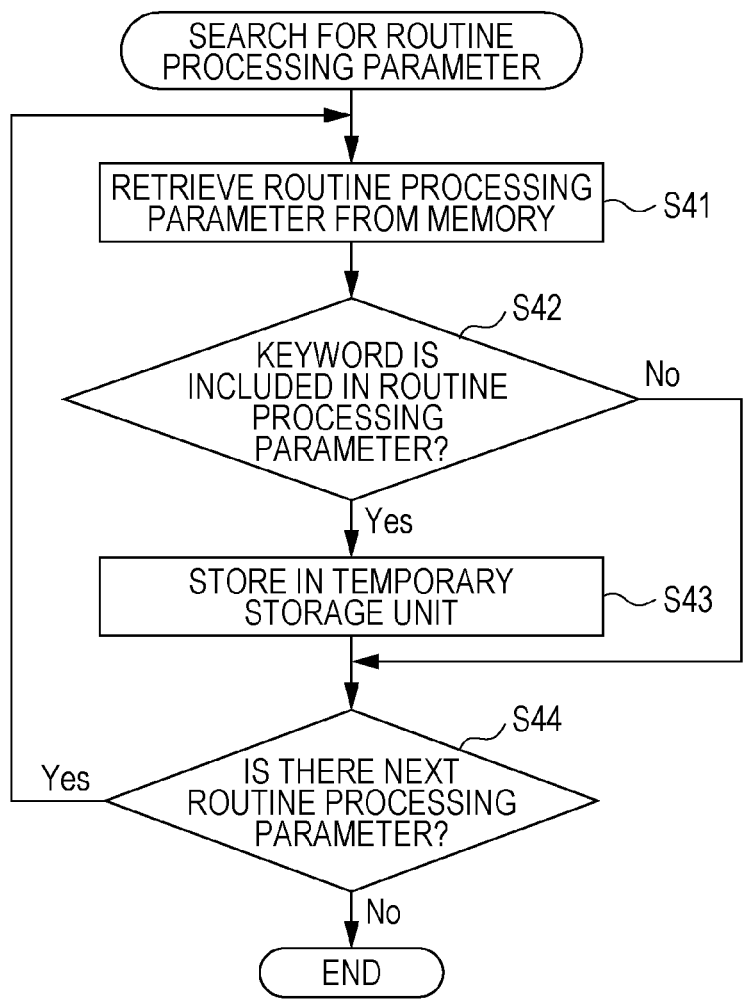
FIG. 8 is a flowchart illustrating an example of the detailed flow of step S4 illustrated in FIG. 7.

An exemplary operation of the image forming apparatus 1 will now be described with reference to the flowcharts illustrated in FIG. 7 and FIG. 8. Here, a case of searching a routine processing icon for transmitting an image obtained by scanning to all the members who have an email address containing the string "minato.taro@g.g" among the members belonging to a group "Yokohama" will be described.

Figure 6:
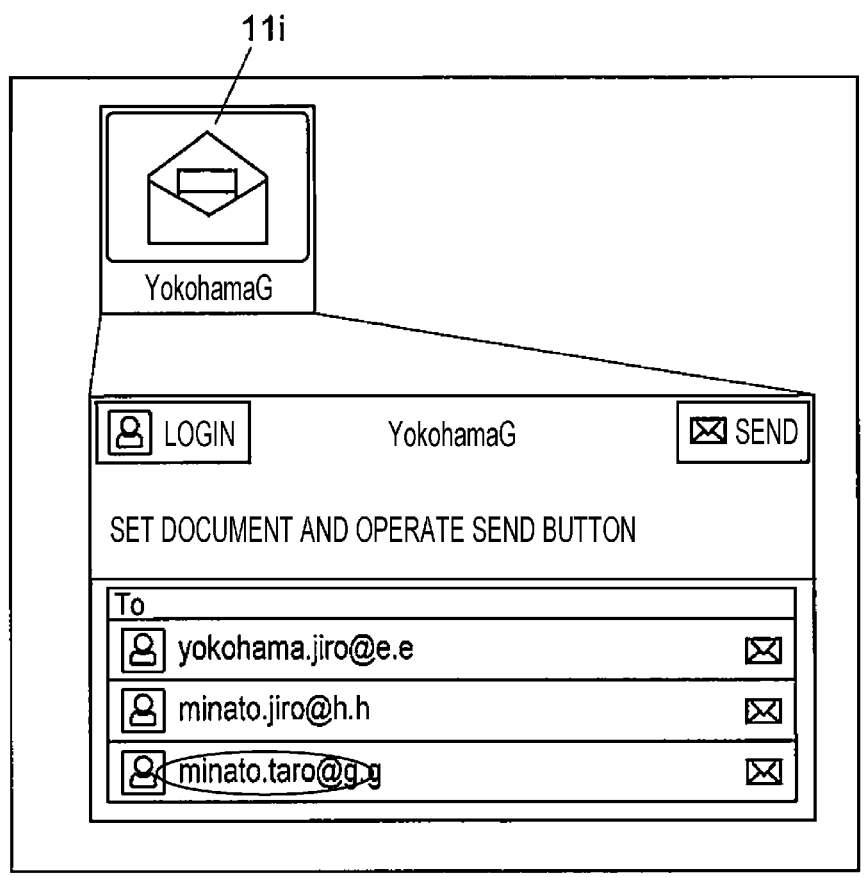
FIG. 6 is a diagram illustrating an example of a routine processing icon that has been set.

FIG. 6 is a diagram illustrating an example of set contents of a routine processing icon. The routine processing icon 11i illustrated in FIG. 6 is used for transmitting an image read by the image reading unit 5 to members who belong to a certain group that is, for example, the group "Yokohama", by email. In the case illustrated in FIG. 6, "yokohama.jiro@e.e", "minato.jiro@h.h", and "minato.taro@g.g" are registered in the routine processing parameter information 31a as email addresses of the members belonging to the group "Yokohama". In addition, the corresponding routine processing icon 11i is registered in the routine processing icon information 31b.

When a user switches on the image forming apparatus 1, the display control unit 23 performs control in such a manner that the home screen 10A illustrated in FIG. 4 is displayed on the operation-display unit 4. The search button 13 and the various icons 11a to 11h are displayed on the home screen 10A.

The user operates the search button 13 of the home screen 10A in order to search for a routine processing icon (S1).

When the search button 13 is operated (S1: Yes), the display control unit 23 causes the operation-display unit 4 to display the search screen.

FIG. 5A is a diagram illustrating an example of the search screen. In addition to the various icons 11a to 11h, the keyword entry field 14 in which a keyword is to be entered is displayed on the search screen 10B (S2).

When the user touches the keyword entry field 14, the display control unit 23 causes the icons 11a to 11h, which have been displayed on the search screen 10B, to be hidden from view as illustrated in FIG. 5B and causes a keyboard 15 and the search result display area 16 to be displayed.

As illustrated in FIG. 5C, the user operates the keyboard 15 and enters a keyword that is, for example, "taro" into the keyword entry field 14 (S3: YES).

The reception unit 20 receives the keyword "taro" entered in the keyword entry field 14. The search unit 22 searches for the routine processing parameter information 31a on the basis of the entered keyword (S4).

When a routine processing parameter that includes the keyword is retrieved by the search, as illustrated in FIG. 5D, the display control unit 23 causes the routine processing icon 11i corresponding to the retrieved routine processing parameter to be displayed on, for example, the upper left position in the search result display area 16 of the search screen 10B (S5). The upper left position in the search result display area 16 is an example of a specific position. Note that the specific position may be a different position that is viewable without scrolling.

Here, the detailed flow of step S4, which has been mentioned above, will be described with reference to the flowchart illustrated in FIG. 8. The search unit 22 retrieves a routine processing parameter of the first routine processing parameter ID (0001) from the routine processing parameter information 31a (S41) and determines whether the retrieved routine processing parameter includes the keyword (S42). When the routine processing parameter includes the keyword (S42: Yes), the routine processing parameter ID is saved in a temporary holding unit, which is not illustrated (S43). After the routine processing parameter ID has been saved in the temporary holding unit, or when the routine processing parameter does not include the keyword in step S42 (S42: No), the search unit 22 determines whether a routine processing parameter of the next routine processing parameter ID is included in the routine processing parameter information 31a (S44). When the routine processing parameter of the next routine processing parameter ID is included in the routine processing parameter information 31a (S44: Yes), the above-mentioned processing operations (S41, S42, S43) are repeated.

In the manner described above, a routine processing parameter ID to which a destination including the entered keyword is set is extracted, and an image data of the corresponding routine processing icon 11i is retrieved from the routine processing icon information 31b and displayed on the search result display area 16 of a search screen 10B as illustrated in FIG. 5D.

Note that a search may be performed on the job memory 32 and the preset data 32 other than the routine processing parameter information 31a. Alternatively, a search may be performed while the search range is set to one of the routine processing parameter information 31a, the job memory 32 and the preset data 33.

Modification 1

Search results may be displayed in a manner that takes into consideration their priorities. For example, when search results are displayed on the search result display area 16 of the search screen 10B, a routine processing icon corresponding to a routine processing parameter in which an email address including a keyword is set to an email destination (To) may be displayed at a relatively upper position in the search result display area 16 of the search screen 10B, and a routine processing icon corresponding to a routine processing parameter in which an email address including the keyword is set to an email carbon copy (Cc) may be displayed at a position lower than the position of the destination (To). As a result, even if a desired email address is set to the carbon copy (Cc), it is easier to find a routine processing parameter in which the desired email address is set to the carbon copy (Cc) from the destinations (To) compared with the case where the routine processing icons are simply arranged in the order of transmission. Note that, as an example of a display manner, a routine processing icon corresponding to a routine processing parameter that is desired to have higher priority may be highlighted and displayed with a color that is more prominent than a color used for the other routine processing icons.

Modification 2

In addition to a keyword, filter processing may be added as a search condition. In this case, the filter processing may be performed after a search using a keyword has been performed, or a search may be performed under conditions including the keyword and the filter processing. For example, by adding the destination (To) as the filter processing, only a routine processing icon corresponding to a routine processing parameter in which an email address that includes the keyword is set to the destination (To) may be displayed. Alternatively, by adding the carbon copy (Cc) as the filter processing, only a routine processing icon corresponding to a routine processing parameter in which an email address that includes the keyword is set to the carbon copy (Cc) may be displayed. In this manner, search results may be narrowed down to routine processing parameters in each of which a desired email address is set to the destination (To) or the carbon copy (Cc).

Modification 3

A user may add their email address as the filter processing. In addition, when an authentication operation (a login) is performed in order to use a multifunction machine, an email address may be included in authentication information as information regarding a user to be authenticated, and the email address may be added as the user's email address.

Modification 4

When a routine processing icon is registered, attribute information items (e.g., user name, user ID, and the like) for identifying a user who has generated the routine processing icon may be added in such a manner that only the routine processing icon generated by the user is displayed in the search results. As a result, in an image processing apparatus that is used by a plurality of user, each of the users may cause the image processing apparatus to display only a routine processing operation generated by the user even if the other users have generated a plurality of routine processing operations.

Modification 5

In the above-described exemplary embodiment, although an email service (an email transmission/reception function) has been described as an example, the same applies to the case of saving into a server. In this case, a search is performed by setting an address such as the IP address of a server as a keyword. This makes it easier to find desired routine processing also in the case of using the "scan (save in server)" icon 11g, which is one of the routine processing icons. In addition, in a copy service, for example, when a search is performed for copy routine processing in which double-sided output is set in order to save paper, an option (double-sided/single-sided, color/monochrome) according to a parameter may be entered in the keyword entry field 14.

Modification 6

Even when search results are listed and displayed on the search screen 10B, the search results are temporarily displayed. Thus, there is a problem in that, if a search is performed once, and a wrong selection is made, it is necessary to redo the search. Accordingly, a folder in which search results are collected may be created, and routine processing icons that have been searched and retrieved may be stored in the folder. The folder is displayed as an icon on the home screen 10A, and for example, when the icon is touched, the contents of the folder, which are the routine processing icons in this case, are displayed such that an execution instruction may be issued.

Modification 7

Even if a routine processing icon corresponding to processing that is desired to be performed is retrieved by the first search, in the case where the location of the routine processing icon is unknown at the time of the next search, a search will be performed each time the processing is desired to be performed. Ultimately, there is a problem in that the names of the routine processing icons are unfavorable. Accordingly, the names of the routine processing icons displayed as search results may be automatically changed to easy-to-understand names. For example, an email address may be set as the name of an icon. Alternatively, a display name that is associated with an email address may be set. In general, the names of owners of email addresses are set to the corresponding email addresses managed by an address book. In addition, a keyword and a routine processing icon selected from search results may be stored as history information into the memory 3, and when the same keyword is entered in the keyword entry field 14 a predetermined number of times, the generation unit 21 may change the name of the corresponding icon to the keyword.

Modification 8

When search results are displayed in the search result display area 16, a plurality of icons may sometimes be extracted. In this case, there is a problem in that it is difficult for a user to distinguish icons that are the same as or similar to each other. Accordingly, the set contents of icons that come up in a search may be displayed.

Although the exemplary embodiment of the present disclosure has been described above, the present disclosure is not limited to the above-described exemplary embodiment. Various modifications may be made, and other exemplary embodiments may be employed within the gist of the present disclosure. For example, in the above exemplary embodiment, although the image forming apparatus has been described as an information processing apparatus, an information processing apparatus such as a personal computer (PC), a tablet terminal, or a multifunction cellular phone (a smartphone) may be employed.

A portion of or the entire controller 2 may be formed of a hardware circuit such as a reconfigurable circuit (a field programmable gate array (FPGA)) or an application specific integrated circuit (ASIC).

Some of the components of the above-described exemplary embodiment may be omitted or changed within the gist of the present disclosure. Addition, removal, change, replacement, or the like of a step may be made in the flow according to the above-described exemplary embodiment within the gist of the present disclosure. The program used in the above-described exemplary embodiment may be provided by being recorded in a computer-readable recording medium such as a CD-ROM. Alternatively, the program used in the above-described exemplary embodiment may be stored in an external server such as a cloud server and may be used via a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory unit that stores set contents that are obtained by changing standard set contents;
a central processing unit generates an instruction unit that instructs execution of processing specified by the changed set contents and stores the instruction unit in such a manner that the instruction unit is associated with the changed set contents,
wherein the central processing unit receives information regarding the set contents;
wherein the central processing unit searches, based on the information, contents stored in the memory unit for the changed set contents that correspond to the information; and
wherein the central processing unit performs control in such a manner as to display a search result,
wherein the central processing unit stores the received information into the memory unit as history information by associating the information with the changed set contents corresponding to the information, and when the central processing unit receives the same information a predetermined number of times, the central processing unit changes a name of the instruction unit to the information.

2. The information processing apparatus according to claim 1,
wherein the central processing unit searches, based on the information, the contents stored in the memory unit for the instruction unit that corresponds to the information, and
wherein the central processing unit performs control in such a manner as to display the instruction unit, which is searched for and retrieved, at a specific position on a screen.

3. The information processing apparatus according to claim 2,
wherein the memory unit stores the instruction unit together with attribute information of a person who has generated the instruction unit, and
wherein the information that is received by the reception unit includes the attribute information regarding the person who has generated the instruction unit.

4. The information processing apparatus according to claim 2,
wherein, when processing that corresponds to the instruction unit is to be immediately performed, the central processing unit causes the set contents of the instruction unit to be displayed in such a manner that the processing is not immediately performed even when the instruction unit is selected, and the instruction unit causes the corresponding processing to be performed when the instruction unit is operated again.

5. The information processing apparatus according to claim 1,
wherein the central processing unit stores the search result into a common folder each time.

6. The information processing apparatus according to claim 1,
wherein, when the changed set contents include an output destination to which a processing result is output, the central processing unit is capable of receiving output destination information that indicates the output destination as the information.

7. The information processing apparatus according to claim 6,
wherein, when the changed set contents include an output destination to which a processing result is output by email, the central processing unit preferentially searches one of a destination and a carbon copy as the output destination information.

8. The information processing apparatus according to claim 7,
wherein the central processing unit performs a search by using the information and filter processing as search conditions in such a manner as to narrow down the search to output destinations set to the destination or output destinations set to the carbon copy.

9. The information processing apparatus according to claim 7,
wherein the central processing unit performs a search by using the information and filter processing as search conditions in such a manner as to narrow down the search to output destinations each of which is a particular user.

10. The information processing apparatus according to claim 1,
wherein the central processing unit performs control in such a manner as to display a selection unit that is used for selecting a search mode, and when the selection unit is operated, the central processing unit enables entry of information regarding the set contents into an entry field.

11. A non-transitory computer readable medium storing a program causing a computer that includes a memory unit storing changed set contents, which are set contents obtained by changing standard set contents, to execute a process, the process comprising:
generating an instruction unit that instructs execution of processing specified by the changed set contents and storing the instruction unit in such a manner that the instruction unit is associated with the changed set contents;
receiving information regarding the set contents;
searching, based on the received information, contents stored in the memory unit for the set contents corresponding to the information;
controlling in such a manner as to display a search result; and
storing the received information into the memory unit as history information by associating the information with the changed set contents corresponding to the information, and when the same information is received a predetermined number of times, changing a name of the instruction unit to the information.

12. An information processing apparatus comprising:
memory means for storing set contents that are obtained by changing standard set contents;
generation means for generating an instruction unit that instructs execution of processing specified by the changed set contents;
the memory means for storing the instruction unit in such a manner that the instruction unit is associated with the changed set contents;
reception means for receiving information regarding the set contents;
search means for searching, based on the information received by the reception means, contents stored in the memory means for the changed set contents that correspond to the information; and
display control means for performing control in such a manner as to display a search result obtained by the search means;
the memory means for storing the received information as history information by associating the information with the changed set contents corresponding to the information; and
the generation means for changing a name of the instruction unit to the information when the same information is received a predetermined number of times.

* * * * *